United States Patent
Joly et al.

(10) Patent No.: US 7,838,598 B2
(45) Date of Patent: Nov. 23, 2010

(54) STYRENIC BLOCK COPOLYMER COMPOSITIONS TO BE USED FOR THE MANUFACTURE OF TRANSPARENT, GEL FREE FILMS

(75) Inventors: Gert Joly, Louvain-La-Neuve (BE); Jaak L. Moerenhout, Louvain-La-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 1017 days.

(21) Appl. No.: 10/537,123

(22) PCT Filed: Dec. 3, 2003

(86) PCT No.: PCT/EP03/50931

§ 371 (c)(1),
(2), (4) Date: Oct. 25, 2005

(87) PCT Pub. No.: WO2004/052989

PCT Pub. Date: Jun. 24, 2004

(65) Prior Publication Data

US 2006/0155044 A1    Jul. 13, 2006

(30) Foreign Application Priority Data

Dec. 6, 2002    (EP) .................... 02027269

(51) Int. Cl.
 *C08L 53/02*  (2006.01)
(52) U.S. Cl. .......................... 525/98; 525/99
(58) Field of Classification Search .......... 525/98, 525/99
See application file for complete search history.

(56) References Cited

U.S. PATENT DOCUMENTS

| | | | |
|---|---|---|---|
| 4,663,220 A | 5/1987 | Wisneski et al. | |
| 4,789,699 A | 12/1988 | Kieffer et al. | |
| 4,970,259 A | 11/1990 | Mitchell et al. | |
| 4,987,194 A | 1/1991 | Maeda et al. | |
| 5,075,377 A | 12/1991 | Kawabuchi et al. | |
| 5,093,422 A | 3/1992 | Himes | |
| 5,399,627 A | 3/1995 | Diehl et al. | |
| 5,618,882 A | 4/1997 | Hammond et al. | |
| 5,705,556 A | 1/1998 | Djiauw et al. | |
| 6,050,871 A | 4/2000 | Chen | |
| 6,096,435 A * | 8/2000 | Maekawa et al. | 428/462 |
| 6,524,980 B1 | 2/2003 | Fensel et al. | |
| 6,833,411 B2 | 12/2004 | Fujiwara et al. | |
| 2002/0001707 A1 | 1/2002 | Zhang et al. | |
| 2002/0160137 A1* | 10/2002 | Varma | 428/35.7 |
| 2003/0191241 A1 | 10/2003 | Fujiwara et al. | |
| 2003/0231928 A1 | 12/2003 | Hilderbrand et al. | |
| 2004/0116582 A1 | 6/2004 | De Keyzer et al. | |

FOREIGN PATENT DOCUMENTS

| | | |
|---|---|---|
| DE | 29 42 128 A1 | 4/1981 |
| EP | 0 802 251 A1 | 10/1997 |
| EP | 0 921 153 A1 | 6/1999 |
| EP | 921153 A1 * | 6/1999 |
| JP | 05070699 A | 3/1993 |
| JP | 05345885 A | 12/1993 |
| JP | 2000-239635 | 9/2000 |
| WO | 01/04208 A1 | 1/2001 |
| WO | WO 0119920 A1 * | 3/2001 |
| WO | 02/057386 A2 | 7/2002 |
| WO | 2004/056924 A1 | 7/2004 |
| WO | 2004/074392 A1 | 9/2004 |
| WO | 2004/074394 A1 | 9/2004 |
| WO | 2004/097523 A1 | 11/2004 |

* cited by examiner

Primary Examiner—Kelechi C Egwim
(74) Attorney, Agent, or Firm—Gregory N. Clements; Michael A. Masse

(57) ABSTRACT

A composition to be used for the manufacture of transparent, gelfree films, comprising: a) at least 65 wt % of a styrenic block copolymer, having a molecular structure according to the formula S—(I/B)—S (1) or [S—(I/B)]n X (2), wherein each S independently is a polymer block of predominantly styrene and (I/B) is a substantially random polymer block of predominantly isoprene and butadiene, wherein n is an integer equal to or greater than 2, and wherein X is the residue of a coupling agent, wherein said styrenic block copolymer having a poly(styrene) content in the range of from 28 to 31% by weight, having poly(styrene) blocks S of a true molecular weight in the range of from 10,000 to 15,000, having a true molecular weight of the complete block copolymer in the range of from 110,000 to 160,000 and wherein the diblock S—(I/B) optionally occurs in a content of at most 20 mol %, b) from 5 to 25 wt % of a second thermoplastic resin, c) from 1 to 10 wt % of a plasticizing oil, the sum of the percentages of the components a, b and c being 100%, and all weight percentages being relative to the weight of the complete composition and extruded or cast or blown mono- or multi-layer films prepared from them.

11 Claims, No Drawings

STYRENIC BLOCK COPOLYMER COMPOSITIONS TO BE USED FOR THE MANUFACTURE OF TRANSPARENT, GEL FREE FILMS

FIELD OF THE INVENTION

The present invention relates to styrenic block copolymer compositions to be used for the manufacture of transparent, gel free films.

More in particular the invention relates to styrenic block copolymer compositions which comprise a styrenic block copolymer, comprising at least one central block obtainable by at random copolymerization of predominantly isoprene and butadiene, to be used for the manufacture of mono- or multilayer films for application in the personal hygiene industry and showing an improved quality.

BACKGROUND OF THE INVENTION

Elastomeric compositions which an be easily extruded into elastic films having low stress relaxation, low hysteresis or permanent set, and high recoverable energy are known from e.g. U.S. Pat. Nos. 4,663,220; 4,789,699; 4,970,259; 5,093,422; 5,705,556.

Processes for making cast extruded films and extrusion blown films have to meet high requirements as to the viscosity of the composition.

At the same time, applications of these extrudates in personal hygiene are related to stringent requirements on mechanical behaviour, i.e. combination of stiffness (high modulus) and excellent elasticity (good stress relaxation and low hysteresis and permanent set) is needed.

One of the greatest challenges in this field is still to find a good balance between flow/viscosity and the mechanical properties mentioned above.

It is an object of the present invention to provide compositions, have an improved balance of properties in personal hygiene applications and more in particular have an improved balance of properties of compositions for mono- or multi-layer films, i.e. compositions showing a higher melt flow rate (MFR) providing softer, transparent films without fines/fish eyes/gels, in combination with lower tensile strength and lower modulus and lower set.

SUMMARY OF THE INVENTION

Accordingly a composition is provided which can be used for the manufacture of transparent, gel free films, comprising:

a) at least 65 wt % of a styrenic block copolymer, having a molecular structure according to the formula S—(I/B)—S (1) or [S—(I/B)]n X (2), wherein each S independently is a polymer block of predominantly styrene and (I/B) is a substantially random polymer block of predominantly isoprene and butadiene in a mutual weight ratio in the range of from 30/70 to 70/30, wherein said polymer block (I/B) has a glass transition temperature (Tg) of at most −60° C. (determined according to ASTM E-1356-98), wherein n is an integer equal to or greater than 2, and wherein X is the residue of a coupling agent, wherein said styrenic block copolymer having a poly (styrene) content in the range of from 28 to 31% by weight, having poly(styrene) blocks S of a true molecular weight in the range of from 10,000 to 15,000, having an apparent molecular weight of the complete block copolymer in the range of from 110,000 to 160,000 and wherein the diblock S—(I/B) optionally occurs in a content of at most 20 mole %, b) from 5 to 25 wt % of a thermoplastic resin, which is different from component (a), c) from 1 to 10 wt % of a plasticizing oil, the sum of the percentages of the components a, b and c being 100%, and all weight percentages being relative to the weight of the complete composition.

It will be appreciated that another aspect of the invention is formed by extruded mono- or multi-layer films and more in particular by cast or blown mono- or multi-layer films for personal hygiene applications, prepared from the hereinbefore specified compositions.

DETAILED DESCRIPTION OF THE INVENTION

Compositions according to the present invention comprise at least 65 wt % of at least one block copolymer of the formulae S—(I/B)—S or [S—(I/B)]n X and are derived from predominantly isoprene and butadiene.

Preferably said compositions comprise said block copolymer in weight proportions of from 70 to 90 wt %.

In preferred compositions, the mutual weight ratio between isoprene and butadiene in the I/B blocks is in the range of from 40/60 to 60/40 wt % and more preferably from 45/55 to 55/45 wt % and most preferably from 48/52 to 52/48 wt %.

With the terms "predominantly styrene" and "predominantly butadiene" respectively, as used throughout the specification, are meant that for the respective blocks to be prepared, substantially pure styrene or mixtures comprising at least 95 wt % of styrene and minor amounts of other comonomers can be used, and substantially pure butadiene or mixtures comprising at least 95 wt % of butadiene and minor amounts of other comonomers, can be used.

The small proportions of other comonomers in the polystyrene blocks can consist of structurally related comonomers such as alpha-methyl styrene, p-methyl styrene, o-methyl styrene, p-test.butyl styrene, dimethyl styrene and vinyl naphtalene, or butadiene and/or isoprene.

The small proportions of other comonomers in the poly (isoprene/butadiene) block can consist of styrene and/or structurally related alkadienes.

However, preferred block coplymers to be applied according to the present invention contain blocks of substantially pure styrene and mixtures of substantially pure isoprene and butadiene.

The block copolymer according to the present invention may be branched or linear and may be a triblock, tetrablock or multiblock.

It has a structure represented by the general formulae

$$S\text{—}(I/B)\text{—}S \qquad (1)$$

or

$$[S\text{—}(I/B)]nX \qquad (2)$$

wherein each S independently is a polymer block of predominantly styrene and (I/B) is a copolymer block of substantially at randomly polymerized mixtures of isoprene and butadiene, in a mutual weight ratio in the range of from 40/60 to 60/40 wt % and preferably from 45/55 to 55/45 wt % and more preferably from 48/52 to 52/48 wt %, wherein said (I/B) block has a glass transition temperature (Tg) of at most −60° C. and preferably in the range of from −85 to −75° C. (determined according to ASTM E-1356-98), wherein n is an integer equal to or greater than 2, and wherein X is the residue of a coupling agent.

The polymer blocks S have a true molecular weight in the range of from 10,000 to 15,000 and preferably from 10,500 to 14,800.

Preferred block copolymers to be used in the compositions of the present invention have apparent total molecular weights in the range of from 115,000 to 155,000.

The poly(styrene) content (PSC) in said block copolymers is in the range of from 28 to 31 wt % and preferably from 29 to 30 wt %.

The block copolymers to be used according to the present invention preferably contain 1,2-vinyl bonds and/or 3,4 vinyl bonds in a proportion of at most 15 wt %, based on the weight of conjugated diene and preferably of at most 10 wt %.

The block copolymers according the present invention preferably have a storage modulus (g1) of from 1 to 10 MPa in a viscoelasticity measurement, in a temperature (7) range of from 0 to 50° C., and only one peak on loss tangent (tan 8) attributable to the mixed isoprene/butadiene polymer block at a temperature of −55° C. or below.

With the term "substantially at random polymerized mixtures of isoprene and butadiene" is actually meant that the central (I/B) blocks only contain average homopolymer block lengths of less than 100 monomer units and preferably of less than 50 monomer units and more preferably of less than 20 monomer units.

Said average homopolymer block length may be determined by various methods.

The method used in the present application is based on carbon-13 NMR and said method has been disclosed in detail in WO 02/057386A, pages 12, 13, 14 and 15.

The block copolymers according to the present invention can be prepared by full sequential polymerization of predetermined batches of predominantly styrene monomer, of isoprene/butadiene mixtures and of predominantly styrene respectively (for triblock copolymers S—(I/B)—S) by anionic polymerization in an inert organic solvent, or by coupling of an initially prepared living diblock copolymer, obtained by sequential polymerization of predetermined batches of predominantly styrene and of predominantly isoprene/butadiene by anionic polymerization in an inert organic solvent, with a coupling agent (to provide triblock or multiblock copolymers).

In both preparation methods the remaining living block copolymers have to be terminated by addition of a proton donating agent, such as an alkanol, e.g. ethanol or water.

It will be appreciated that block copolymers, prepared by means of coupling of living diblock copolymers by means of a coupling agent and termination of remaining living block copolymers, will finally contain small amounts (i.e. less than 20 mole % and preferably less than 15 mole % and more preferably less than 10 mole %) of diblock copolymer, having the same S blocks (mole % relative to the weight of the total block copolymer).

As examples of the coupling agent may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, diethyldichlorosilane, monobutyldichlorosilane, dibutyldichlorosilane, monohexyldichlorosilane, dihexyldichlorosilane, dibromosilane, monomethyldibromosilane, dimethyldibromosilane, silicon tetrachloride and silicon tetrabromide; alkoxysilanes such as tetramethoxysilane; divinyl aromatic compounds such as divinylbenzene en divinyl naphthalene; halogenated alkanes such as dichloroethane, dibromoethane, methylene chloride dibromomethane, dichloropropane, dibromopropane, chloroform, trichloroethane, trichloropropane and tribromopropane; halogenated aromatic compounds such as dibromobenzene; epoxy compounds such as the diglycidyl ether of bisphenol-A (e.g. EPON 825 or EPON 826, a trademark), and other coupling agents such as benzoic esters, CO2, 2-chloroprene and 1-chloro-1,3-butadiene and diethyladipate or dimethyladipate.

Of these EPON 825, diglycidyl ethers, dibromobenzene, tetramethoxysilane and dimethyldichlorosilane are preferred.

The apparent molecular weights of the complete block copolymers and each of the intermediate precursors have been determined by Gel Permeation Chromatography, and expressed in terms of standard poly(styrene), by using the method described:—ASTM D 3536.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

The block copolymers according to the general formulae (1) and (2) can be made by mere adaptation of common processes used for the preparation of S—B—S type block copolymers and/or S—I—S type block copolymers, using a mixture of butadiene/isoprene instead. Of importance in the preparation of the block copolymers according to the present invention is to avoid homopolymer block formation, to ensure appropriate B/I ratio, and to produce a polymer block wherein the random midblock has a Tg of −60° C. or less. This generally rules out the use of randomizers, as for instance used by Kuraray in the production of hydrogenated styrene isoprene/butadiene block copolymers (reference is made to U.S. Pat. No. 5,618,882 which is incorporated herein.

It may also be beneficial to adapt the process by adding one or both comonomers during the formation of the mixed midblock.

Component (b)

The second different thermoplastic polymer component (b) may be selected from the group of polyolefins, polystyrene resins, coumarone-indene resins, polyindene resins, poly(methylindene) resins, alfa-methylstyrene resins, polyphenylene resins (and in particular poly(2,6-dimethyl-1,4-phenylene ether) or mixtures of said resins or copolymers of styrene and other compatible comonomers such as alpha methyl styrene, methyl styrene, vinyl toluene.

Suitable examples of poly(olefin) resins are poly(ethylene), polypropylene or copolymers of ethylene, propylene, alone or with other comonomers such as EPDM.

Examples of poly(ethylene are HDPE, LDPE, LLDPE. Ethylene or propylene polymers prepared with metallocene catalysts can also be used.

Preferred components (b) are polystyrenes, having a high molecular weight (i.e. greater than 30,000) clear poly(styrene), toughened poly(styrene) or other poly(styrene) homopolymers or copolymers of styrene and other compatible comonomers, such as alpha methyl styrene, methyl styrene, vinyl toluene, or blends of polystyrene and poly(phenylene) resins.

A more preferred component (b) is PS 144c poly(styrene) resin of BASF. Said polystyrenes provide in the compositions of the present invention films, which are transparent and water-white.

The composition preferably comprises from 8 to 12% w of the second different polymer, relative to the weight of the complete composition.

Component (c)

Suitable plasticizers include plasticizing oils like low aromatic content hydrocarbon oils that are paraffinic or naphthenic in character (carbon aromatic distribution <5%, preferably <2%, more preferably 0% as determined according to DIN 51378). Those products are commercially available from the Royal Dutch/Shell Group of companies, like SHELLFLEX, CATENEX, and ONDINA oils. Other oils include KAYDOL oil from Witco, or TUFFLO oils from Arco or PRIMOL oils from EXXON-MOBIL. Other plasticizers include compatible liquid tackifying resins like REGALREZ R-1018. (SHELLFLEX, CATENEX, ONDINA, KAYDOL, TUFFLO, PRIMOL and REGALREZ are trademarks).

Other plasticizers may also be added, like olefin oligomers; low molecular weight polymers (<30,000 g/mol) like liquid polybutene, liquid polyisoprene copolymers, liquid styrene/isoprene copolymers or liquid hydrogenated styrene/conjugated diene copolymers; vegetable oils and their derivatives; or paraffin and microcrystalline waxes.

More preferably the plasticizer represents a plasticizing oil selected from paraffinic or naphtenic oils, in an amount of from 4 to 6 wt %, relative to the weight of the complete composition.

Additional Auxiliaries

Other rubber components may be incorporated into the adhesive compositions according to the present invention. It is also known in the art that various other components can be added to modify the tack, the odor, the color of the present compositions and of the resulting film. Antioxidants and other stabilizing ingredients can also be added to protect the composition of the present invention from degradation induced by heat, light and processing or during storage.

Several types of antioxidants can be used, either primary antioxidants like hindered phenols or secondary antioxidants like phosphite derivatives or blends thereof. Examples of commercially available antioxidants are IRGANOX 565 from Ciba-Geigy (2,4-bis-(n-octylthio)-6-(4-hydroxy-3,5-di-tertiary-butyl anilino)-1,3,5-triazine), IRGANOX 1010 from Ciba-Geigy (tetrakis-ethylene-(3,5-di-tertiary-butyl-4-hydroxy-hydrocinnamate)methane) and POLYGARD HR from Uniroyal (tris-(2,4-di-tertiary-butyl-phenyl)phosphite). Other antioxidants developed to protect the gelling of the polybutadiene segments can also be use, like the SUMILIZER GS from Sumitomo (2[1-(2-hydroxy-3,5-di-ter-pentylphenyl)ethyl)]-4,6-di-tert-pentylphenylacrylate); SUMILIZER T-PD from Sumitomo (pentaerythrythyltetrakis(3-dodecylthiopropionate)); or mixtures thereof. (IRGANOX, POLYGARD and SUMILIZER are trademarks).

Preparation of the Composition

No particular limitation is imposed on the preparation process of the compositions according to the present invention for the manufacture of films.

Therefore, there may be used any process such as a mechanically mixing process making use of rolls, a Banbury mixer or a Dalton kneader, or twin-screw extruder, thereby obtaining an intimate solution of the composition aimed at.

Use of the Composition

The composition according to the present invention is used for the manufacture of transparent, gel free and preferably water-white, cast extruded or extrusion blown films, the combination of mechanical of which and the viscosity of the composition under processing conditions, has been found to be very attractive.

More in particular the composition shows an improved balance of properties of films in personal hygiene applications, i.e. a combination of higher melt flow rate (MFR) and providing softer transparent water-white mono- or multilayer films showing lower tensile strength, low modulus, lower set and no fines/fish eyes/gels.

The present invention will hereinafter be described more specifically by reference to the following examples and comparative examples, however without restricting its scope to these specific embodiments.

Incidentally, all designations of "parts" and "%" as will be used in the following examples mean parts by weight and wt % unless expressly noted otherwise.

EXAMPLES

Synthesis of block copolymers A and B.

Cyclohexane, styrene, butadiene and isoprene were purified by activated aluminiumoxide and stored at 4° C. under a nitrogen atmosphere.

Dibromoethane (EDB) was used as coupling agent.

Prior to the synthesis, a monomer mixture of butadiene and isoprene (at a weight/weight ratio given in Table 1) was prepared and stored under nitrogen at 4° C.

An autoclave, equipped with a helical stirrer, was charged with cyclohexane and the content was heated to a temperature in the range from 50 to 60° C.

As initiator sec. BuLi was dosed, immediately followed by styrene monomer, which was allowed to polymerize to completion. The reaction temperature was increased to 70° C., at which temperature a isoprene/butadiene monomer mixture (I/B) was dosed and reacted.

The resulting diblock was either coupled with an excess EDB or further reacted with an additional batch of styrene monomer (full sequential polymerization for S—(I/B)—S triblock copolymer).

The excess of coupling agent was optionally scavenged with sec-BuLi and followed by addition of ethanol as terminator, or the living triblock copolymer was terminated by addition of ethanol The reaction mixture was cooled to 40° C., transported to a blending vessel and a stabilization package was added (comprising IRGANOX 565 and tris{nonylphenol}phosphate 0.08/0.35 phr as a cyclohexane solution) and stirred at ambient temperature.

Dry block copolymer was obtained by steam coagulation finishing, followed by drying in an oven.

The polymer was analyzed by GPC according to the method described in U.S. Pat. Nos. 5,516,824 and 5,499,409, which are herein incorporated by reference. The results of GPC analysis have been listed in Table 1

TABLE 1

|  | Polymer | |
| --- | --- | --- |
|  | A | B |
| Mw poly(styrene) *10³ | 14.8 | 10.9 |
| Mw Total blockcopol *10³ | 153 | 117 |
| Coupling efficiency % | 86 |  |
| Poly(styrene content) | 29.5 | 30.0 |
| I/B ratio | 50/50 | 50/50 |
| Vinyl in B wt % | 8 | 8 |
| Vinyl in I wt % | 5 | 5 |

The average homopolymer block lengths in the (I/B) blocks have been determined by 13C NMR, using the method as disclosed in W002/057386.

13C NMR spectra of polymer samples were obtained with a Bruker AMX-500 FT spectrometer operating at 125 MHz. Quantitative proton-decoupled spectra were recorded with a 90° 13C excitation pulse and a repetition rate of 10 s. 10% (w/w) of polymer solutions in CDCl3 were used. To improve the relaxation time, 0.1 mol/l chromium acetyl acetonate was added. The applied line broadening was 2 Hz. The spectra were referenced such that the aliphatic carbons of trans.polybutadiene are at 31.9 ppm.

The polystyrene content was determined by 1H NMR. Glass transition temperatures Tg have been determined by Differential Scanning Calorimetry with a temperature sweep of 40° C./min.

The Tg is measured at the onset of the transition. The details of the additional components used in these specified compositions, have been listed in table 2.

Compositions for the preparation of cast films were prepared by mixing the components as listed in Table 3 in a Werner & Pfleiderer twin-screw extruder, while also the relevant physical properties of the compositions have been specified in said table 3.

TABLE 2

| | |
| --- | --- |
| KRATON ® D 1152 ES | is a linear styrene-butadiene-styrene block copolymer with a PSC of 29.5%, a total molecular weight of 122,000 and a coupling efficiency of 83% |
| KRATON ® D 1161 NS | is a linear styrene-isoprene-styrene block copolymer with a PSC of 15%, a total molecular weight of 220,000 and a coupling efficiency of 81% |
| KRATON ® D 1102 CS | a linear styrene-butadiene-styrene block copolymer with a PSC of 29.5%, a total molecular weight of 127,000 and a coupling efficiency of 84%. |
| BASF PS 144c | a homo poly(styrene) polymer |
| PRIMOL ™ 352 | is a paraffinic oil |
| IRGANOX ™ 565 | is an antioxidant from CIBA-GEIGY |
| EPOLENE ™ C-10 | is a low density poly(ethylene) from EASTMAN |
| DOWLEX ™ SC 2107 | is a linear low density poly(ethylene) from DOW CHEMICAL |

TABLE 3

| | Examples | | | | | | | |
| --- | --- | --- | --- | --- | --- | --- | --- | --- |
| | I | II | III | IV | V | VI | VII | VIII |
| Blockcopolymer A | 70 | 70 | 85 | 90 | 85 | 90 | 85 | 90 |
| Blockcopolymer B | | | | | | | | |
| KRATON D-1152ES | | | | | | | | |
| KRATON D-1102CS | | | | | | | | |
| KRATON D-1161NS | 15 | 20 | | | | | | |
| BASF PS 144c | 10 | 10 | 10 | 10 | | | | |
| Epolene C-10 | | | | | 10 | 10 | | |
| Dowlex SC2107 | | | | | | | 10 | 10 |
| Primol 352 | 5 | | 5 | | 5 | | 5 | |
| Irganox 565 | 1 | 1 | 1 | 1 | 1 | 1 | 1 | 1 |
| MFR (200° C./5 kg) | 21.7 | 12 | 14.5 | 6 | 23 | 12.5 | 11.5 | 6.5 |
| Cast film results | transparent average amount/size gels | transparent no gels; best | transparent no gels - best | transparent no gels - best | opaque orange skin | | slightly opaque orange skin | |
| mod. 100% (MPa) | 1.22 | 1.62 | 1.83 | 2.79 | 1.99 | 2.25 | 2.22 | 2.57 |
| mod. 200% (MPa) | 1.52 | 1.87 | 2.28 | 3.48 | 2.10 | 2.4 | 2.46 | 2.87 |

TABLE 3-continued

| | | | | | | | | |
|---|---|---|---|---|---|---|---|---|
| mod. 300% (MPa) | 1.85 | 2.22 | 2.64 | 4.13 | 2.25 | 2.58 | 2.68 | 3.24 |
| mod. 500% (MPa) | 2.72 | 3.01 | 3.43 | 5.14 | 2.51 | 2.83 | 3.06 | 3.86 |
| TS (MPa) | 5.1 | 5.4 | 6.2 | 9.2 | 5.1 | >8 | >8 | >14 |
| EB (%) | 1170 | 1520 | 1710 | 1725 | 1655 | >2000 | >2000 | >2000 |
| 1st hysteresis (%) | 52.5 | 63.9 | 55.6 | 57.2 | 61.7 | 65.3 | 61.0 | 62.5 |
| 2nd hysteresis (%) | 36.5 | 44.0 | 33.8 | 33.4 | 34.2 | 36.7 | 34.5 | 36.3 |
| set (%) | 5.8 | 10.7 | 4.5 | 4.8 | 5.7 | 6.3 | 5.5 | 5.7 |

| | Examples | | comparative examples | | | |
|---|---|---|---|---|---|---|
| | IX | X | i | ii | iii | iv |
| Blockcopolymer A | | | | | | |
| Blockcopolymer B | 85 | 90 | | | | |
| KRATON D-1152ES | | | 70 | | 70 | |
| KRATON D-1102CS | | | | 70 | | |
| KRATON D-1161NS | | | 15 | 15 | 20 | 20 |
| BASF PS 144c | 10 | 10 | 10 | 10 | 10 | 10 |
| Epolene C-10 | | | | | | |
| Dowlex SC2107 | | | | | | |
| Primol 352 | 5 | | 5 | 5 | | |
| Irganox 565 | 1 | 1 | 1 | 1 | 1 | 1 |
| MFR (200° C./5 kg) | 22 | 12.5 | 13.5 | 18 | 9.5 | 11.5 |
| Cast film results | | | transparent small amount gels; 3rd best | transparent yellow many gels; worst | transparent small amount gels; 2nd best | transparent yellow little gels |
| mod. 100% (MPa) | 1.75 | 2.22 | 1.39 | 1.68 | 1.79 | 2 |
| mod. 200% (MPa) | 2.28 | 2.91 | 1.74 | 2.06 | 2.22 | 2.42 |
| mod. 300% (MPa) | 3.05 | 3.66 | 2.14 | 2.51 | 2.72 | 2.91 |
| mod. 500% (MPa) | 5.48 | 6.13 | 3.2 | 3.68 | 3.93 | 4.19 |
| TS (MPa) | 11.7 | 21.4 | 6.8 | 7.5 | 8.0 | 11.9 |
| EB (%) | 1435 | 1800 | 1420 | 1245 | 1520 | 1730 |
| 1st hysteresis (%) | 28.4 | 39.0 | 51.9 | 50.1 | 56.6 | 54.0 |
| 2nd hysteresis (%) | 16.0 | 19.3 | 35.8 | 33.6 | 39.1 | 35.0 |
| set (%) | 4.3 | 5.6 | 7.1 | 8.0 | 9.1 | 8.4 |
| Molecular parameters | Midblock | | Step I | MW | PSC | CE | Coupled |
| Blockcopolymer A | 50/50 B/I | | 14.8 | 153 | 29.5 | 86 | Full |
| Blookcopolymer B | 50/50 B/I | | 10.9 | 117 | 30 | 100 | Sequential |

Test Methods

Melt flow rate (MFR): ASTM D 1238-95 (230° C., 2.16 kg)

Tensile properties according to ASTM D 882-81 (tested on films

Hysteresis: films are elongated to 80% extension at a speed of 100 mm/sec (load step) held for 30 sec. and then relaxed to zero force (unload step). A second cycle follows right after the first one. Hysteresis is measured as the difference in energy between the load and unload step. Permanent set is measured as the difference between the original sample length of the first cycle (force equals zero) and the sample length before the second cycle (force equals zero).

It will be appreciated from the results in Table 4 that the use of the block copolymers A and B (S—(I/B)—S) in compositions I—X, provides an improved processing stability, an improved film quality and at least equal mechanical properties, as compared to compositions, comprising blends of SBS and SIS block copolymers.

The invention claimed is:

1. A composition to be used for the manufacture of transparent, gel-free films, comprising:
   a) at least 65 wt % of a styrenic block copolymer, having a molecular structure according to the formula $$S—(I/B)—S \quad (1)$$

or $$[S—(I/B)]_nX \quad (2),$$

wherein each S independently is a polymer block of predominantly styrene and (I/B) is a substantially random polymer block of predominantly isoprene and butadiene in a mutual weight ratio in the range of from 30/70 to 70/30, wherein said polymer block (I/B) has a glass transition temperature (Tg) of at most −60° C. (determined according to ASTM E-1356-98), wherein n is an integer equal to or greater than 2, and wherein X is the residue of a coupling agent, wherein said styrenic block copolymer having a poly(styrene) content in the range of from 28 to 31% by weight, having poly(styrene) blocks S of a true molecular weight in the range of from 10,000 to 15,000, having an apparent molecular weight of the complete block copolymer in the range of from 110,000 to 160,000 and wherein the diblock S—(I/B) optionally occurs in a content of at most 20 mol %, b) from 5 to 25 wt % of a second thermoplastic resin selected from poly(styrene), polyethylene, polypropylene or copolymers of ethylene and propylene, c) from 0 to 10 wt % of a plasticizing oil, the sum of the percentages of the components a, b and c being 100%, and all weight percentages being relative to the weight of the complete composition.

2. The composition of claim 1, wherein the component (a) occurs in a weight proportion of from 70 to 90 wt %.

3. The composition of claim 1, wherein polymer block (I/B) has average homopolymer block length PB, respectively PI of less than 100 monomer units.

4. The composition of claim 2 wherein polymer block (I/B) has average homopolymer block length PB, respectively PI of less than 50 monomer units.

5. The composition of claim 3, wherein the mutual weight ratio between isoprene and butadiene is in the range of from 48/52 to 52/48.

6. The composition of claim 1, wherein component (b) occurs in a weight proportion of from 8 to 12 wt %.

7. The composition of claim 1, wherein the component (c) occurs in a weight proportion of from 1 to 10 wt %.

8. The composition of claim 1, wherein the component (c) occurs in a weight proportion of from 4 to 6 wt %.

9. The composition of claim 1, wherein the component (a) comprises poly(styrene) blocks S, having a true molecular weight in the range of from 10,500 to 15,000, and said block copolymer has an apparent molecular weight of from 115,000 to 155,000, and has a poly(styrene) content of from 29 to 30%, and has a diblock S—(I/B) content of from 0 to 15 mole %.

10. The composition of claim 1, wherein
   i. said component (a) comprises poly(styrene) blocks S, having a true molecular weight in the range of from 10,500 to 15,000,
   ii. said block copolymer has an apparent molecular weight of from 115,000 to 155,000, a poly(styrene) content of from 29 to 30%, and a diblock S—(I/B) content of from 0 to 15 mole %,
   iii. said component (a) occurs in a weight proportion of from 70 to 90 wt %, said component (b) occurs in a weight proportion of from 8 to 12 wt %, and said component (c) occurs in a weight proportion of from 4 to 6 wt % and
   iv. said polymer block (I/B) has an average homopolymer block length PB, respectively PI of less than 100 monomer units.

11. A composition to be used for the manufacture of transparent, gel-free films, comprising:

a) at least 65 wt % of a styrenic block copolymer, having a molecular structure according to the formula [S—(I/B)]nX, wherein each S independently is a polymer block of predominantly styrene and (I/B) is a substantially random polymer block of predominantly isoprene and butadiene in a mutual weight ratio in the range of from 30/70 to 70/30, wherein said polymer block (I/B) has a glass transition temperature (Tg) of at most −60° C. (determined according to ASTM E-1356-98), wherein n is an integer equal to or greater than 2, and wherein X is the residue of a coupling agent, wherein said styrenic block copolymer having a poly(styrene) content in the range of from 28 to 31% by weight, having poly(styrene) blocks S of a true molecular weight in the range of from 10,000 to 15,000, having an apparent molecular weight of the complete block copolymer in the range of from 110,000 to 160,000 and wherein the diblock S—(I/B) optionally occurs in a content of at most 20 mol %, b) from 5 to 25 wt % of a second thermoplastic resin selected from poly(styrene), polyethylene, polypropylene or copolymers of ethylene and propylene, c) from 0 to 10 wt % of a plasticizing oil, the sum of the percentages of the components a, b and c being 100%, and all weight percentages being relative to the weight of the complete composition.

* * * * *